(12) United States Patent
Riedel et al.

(10) Patent No.: US 7,113,021 B2
(45) Date of Patent: Sep. 26, 2006

(54) VOLTAGE DOUBLER CIRCUIT

(75) Inventors: Friedbert Riedel, Zürich (CH); Christopher Rodd Speirs, Zürich (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/525,861

(22) PCT Filed: Aug. 21, 2003

(86) PCT No.: PCT/IB03/03430

§ 371 (c)(1), (2), (4) Date: Feb. 25, 2005

(87) PCT Pub. No.: WO2004/021553

PCT Pub. Date: Mar. 11, 2004

(65) Prior Publication Data
US 2006/0006924 A1  Jan. 12, 2006

(30) Foreign Application Priority Data
Aug. 28, 2002 (EP) .................................. 02102227

(51) Int. Cl.
G05F 1/10 (2006.01)

(52) U.S. Cl. ...................................... 327/536; 327/537

(58) Field of Classification Search ................ 327/534, 327/536, 537; 363/60
See application file for complete search history.

(56) References Cited

U.S. PATENT DOCUMENTS

| | | | |
|---|---|---|---|
| 4,777,577 A | 10/1988 | Bingham et al. | |
| 5,041,739 A * | 8/1991 | Goto | 327/536 |
| 5,159,543 A * | 10/1992 | Yamawaki | 363/60 |
| 5,339,236 A | 8/1994 | Tamagawa | |
| 5,444,310 A * | 8/1995 | Kataoka et al. | 307/125 |
| 5,493,486 A | 2/1996 | Connell et al. | |
| 5,532,916 A | 7/1996 | Tamagawa | |
| 6,021,056 A * | 2/2000 | Forbes et al. | 363/60 |
| 6,483,282 B1 * | 11/2002 | Bayer | 323/315 |
| 6,486,729 B1 * | 11/2002 | Imamiya | 327/536 |
| 6,498,527 B1 * | 12/2002 | Matsumoto | 327/536 |
| 6,556,064 B1 * | 4/2003 | Yatabe | 327/536 |
| 2004/0021504 A1 * | 2/2004 | Mihara | 327/536 |
| 2004/0061549 A1 * | 4/2004 | Imamiya | 327/536 |
| 2004/0246044 A1 * | 12/2004 | Myono et al. | 327/536 |
| 2005/0040882 A1 * | 2/2005 | Geen | 327/536 |

* cited by examiner

Primary Examiner—Timothy P. Callahan
Assistant Examiner—Cassandra Cox
(74) Attorney, Agent, or Firm—Kevin H. Fortin

(57) ABSTRACT

The invention relates to a voltage processing unit comprising an integrated charge pump 11 for multiplying a voltage $V_x$ applied to an input of the integrated charge pump 11 by a predetermined factor $X_m$. In order to enable a multiplication of an available voltage by a desired factor with a reduced required area for the integrated charge pump, it is proposed that the voltage processing unit further comprises an external voltage doubling circuit 12 for amplifying an available voltage $V_{dd}$ and for applying the amplified voltage $V_x$ to the input of the integrated charge pump 11. The invention relates equally to a corresponding method.

5 Claims, 2 Drawing Sheets

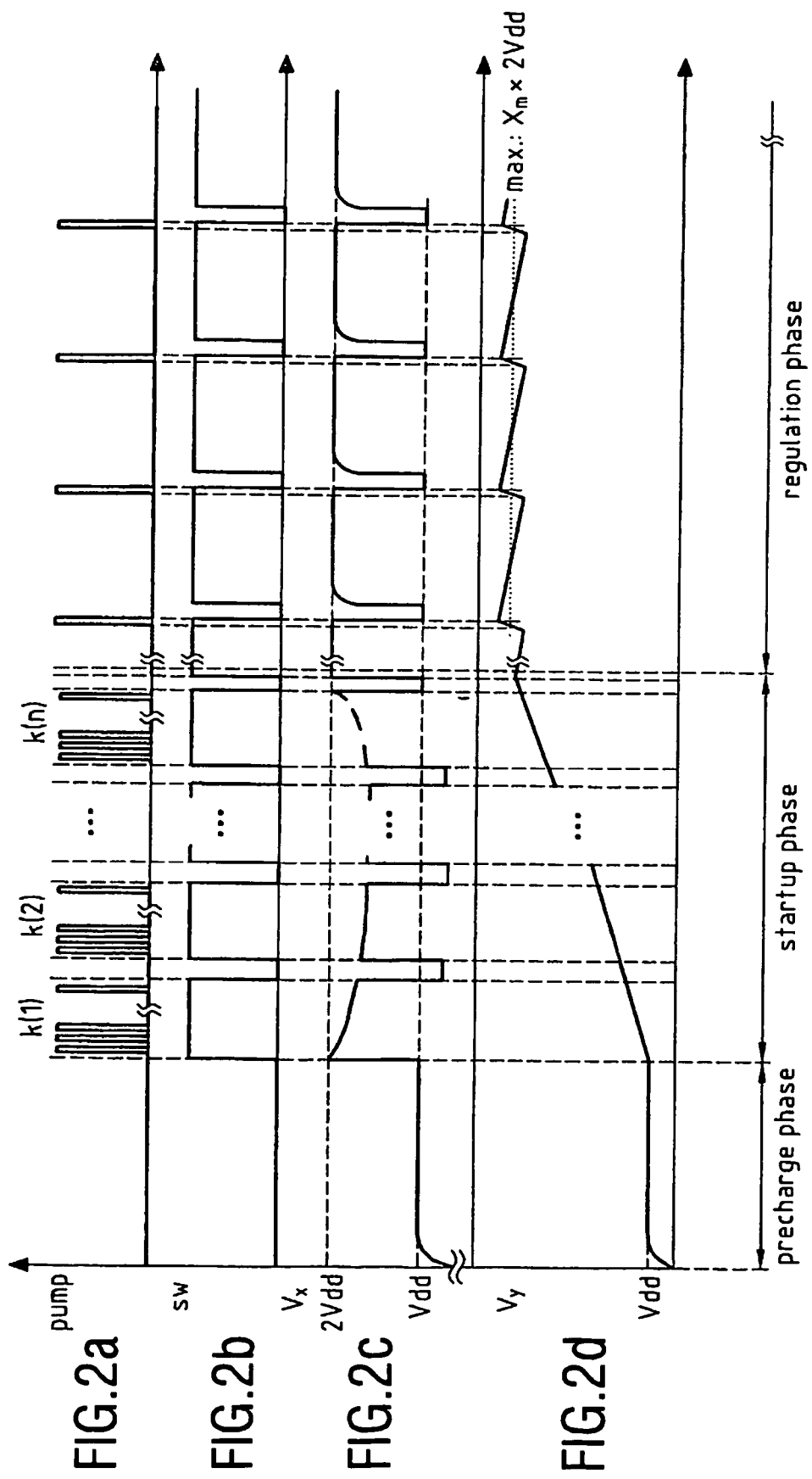

VOLTAGE DOUBLER CIRCUIT

The invention relates to a voltage processing unit comprising an integrated charge pump, which integrated charge pump multiplies a voltage applied to its input by a predetermined factor.

The invention relates equally to a method for providing an amplified voltage

Integrated charge pumps which multiply an available voltage by a predetermined factor are known from the state of the art, e.g. as Dickson charge pumps. An improved fully integrated Dickson charge pump has been described by J. Shin et al. in "A New Charge Pump Without Degradation in Threshold Voltage Due to Body Effect.", IEEE J. Solid-State Circuits, vol. 35, pp. 1227–1230, August 2000. The charge pump presented in this document consists of m−1 stages with m−1 capacitors and multiplies an input voltage Vdd by a factor m.

It is a disadvantage of such an integrated charge pump that it requires a large area, since the internal integrated m−1 capacitors take up most of the place in many technologies.

It is an object of the invention to enable a multiplication of an available voltage by a desired factor with a reduced required area of an employed integrated charge pump.

This object is reached according to the invention with a voltage processing unit which comprises an integrated charge pump for multiplying a voltage applied to an input of the integrated charge pump by a predetermined factor and which further comprises an external doubling circuit for amplifying an available voltage and for applying the amplified voltage to the input of the integrated charge pump.

The object of the invention is equally reached with a method for providing an amplified voltage. The proposed method comprises in a first step amplifying an available voltage by means of a voltage doubling circuit. In a second step, the proposed method comprises multiplying the amplified voltage by a predetermined factor by means of an integrated charge pump.

The invention proceeds from the idea that an integrated charge pump can be combined advantageously with a voltage doubling circuit, since this enables a significant reduction of the multiplication stages in the integrated charge pump while maintaining the desired total multiplication factor. In the ideal case, the available voltage is doubled by the voltage doubling circuit so that this doubled voltage can be used as input voltage for the integrated charge pump.

It is thus an advantage of the invention that it enables a reduction of the area of the integrated charge pump by up to one half for a desired amplification factor. Alternatively, the minimum of the voltage that has to be available for a desired output of a given integrated charge pump could be reduced significantly, e.g. to 1.8V.

Preferred embodiments of the invention become apparent from the dependent claims In one preferred embodiment of the invention, the voltage doubling circuit is controlled by signals provided by the integrated charge pump. Integrated charge pumps are operated with pump signals which switch internal switching means. Depending on the type of the integrated charge pump, selected ones of these pump signals may be provided by the integrated charge pump to the voltage doubling circuit. This allows to operate the voltage doubling circuit in coordination with the respective charge extracted from the voltage doubling circuit by the integrated charge pump.

In a further preferred embodiment of the invention, the voltage doubling circuit realize a voltage shifting by means of a single charged capacitor. State of the art voltage doubling circuits employ a minimum of two capacitors and up to six switches, e.g. the voltage doubling circuit described by P. Favrat, P. Deval and M. J. Declercq in "A High-Efficiency CMOS Voltage Doubler", IEEE J. Solid-State Circuits, vol. 33, pp. 410–416, March 1998. It is thus an advantage of the proposed embodiment of the invention that it only requires a single capacitor. This reduces the required overall chip area and thus the costs even further. Nevertheless, a similarly good power efficiency can be achieved when combining a voltage doubling circuit comprising a single capacitor with an integrated charge pump as when combining a voltage doubling circuit comprising two or more capacitors with an integrated charge pump.

As indicated in the cited document "A High-Efficiency CMOS Voltage Doubler", the power efficiency of voltage doubling circuits depends on whether external or integrated capacitors are used, including the parasitic stray capacitances to ground. For a power efficiency of about 95%, external capacitors are preferred.

The invention can be employed in a variety of fields, for example for realizing display drivers.

Other objects and features of the present invention will become apparent from the following detailed description considered in conjunction with the accompanying drawings, wherein FIG. 1 schematically shows an embodiment of a voltage processing unit according to the invention; and FIG. 2a)–d) are diagrams illustrating by way of example the operation of the voltage processing unit of FIG. 1.

FIG. 1 depicts an embodiment of a voltage processing unit according to the invention, which is used for amplifying an available voltage by a desired factor.

The voltage processing unit of FIG. 1 comprises an integrated internal charge pump 11 and a voltage doubling circuit 12.

The internal charge pump 11 can consist for example of a Dickson charge pump. It has a multiplication factor of $X_m$ and a regulated output. The multiplication factor $X_m$, which may be adjustable, is about half of the desired total amplification factor of the voltage processing unit. The voltage output of the internal charge pump is connected to a load 13, for example to a display of some device. The internal charge pump 11 further comprises a signal output at which pump signals employed within the internal charge pump are provided to the outside.

The voltage doubling circuit 12 comprises an external capacitor C and an external charge pump 14 with a voltage source 15 providing a voltage Vdd, a loadswitch lsw, a shiftswitch ssw and a control logic 16. It is understood that the voltag source 15 does not have to be included in the voltage processing unit of the invention itself, but could also be connected to it.

The voltage source 15 is connected on the one hand to ground Gnd and on the other hand via the loadswitch lsw to the input of the internal charge pump 11. The top plate of the capacitor C is equally connected to the input of the internal charge pump 11, while the bottom plate of the capacitor C is connected via the shiftswitch ssw either to ground Gnd or to the connection between the voltage source 15 and the loadswitch lsw.

The switches lsw, ssw are realized with PMOS transistors. When a low signal sw is applied to the loadswitch lsw, the loadswitch lsw connects the voltage source 15 to the input of the internal charge pump 11. When a high signal sw is applied to the loadswitch lsw, the loadswitch lsw disconnects the voltage supply from the input of the internal charge pump 11. When a low signal sw is applied to the shiftswitch ssw, the shiftswitch ssw connects the capacitor C to ground Gnd. When a high signal sw is applied to the shiftswitch ssw, the shiftswitch ssw connects the capacitor C to the voltage source 15.

The control logic 16, finally, comprises a counter and a trigger circuit. An input of the control logic 16 is connected to the signal output of the internal charge pump 11, while an output of the control logic 16 is connected on the one hand to a control input of the loadswitch lsw and on the other hand to a control input of the shiftswitch ssw.

The operation of the voltage processing unit of FIG. 1 will now be described with reference to FIGS. 2a to d.

FIG. 2a is a diagram illustrating pump signals "pump", which are output at the signal output of the internal charge pump 11.

FIG. 2b is a diagram illustrating a signal sw output by the control logic 16 upon receipt of the pump signals provided by the internal charge pump 11. The signal sw is applied to both of the switches lsw, ssw of the external charge pump 14.

FIG. 2c is a diagram illustrating the voltage $V_x$ applied by the voltage doubling circuit 12 to the input of the internal charge pump 11.

FIG. 2d is a diagram illustrating the voltage $V_y$ provided at the voltage output of the internal charge pump 11, when a load 13 is connected to this voltage output.

Figure 1:
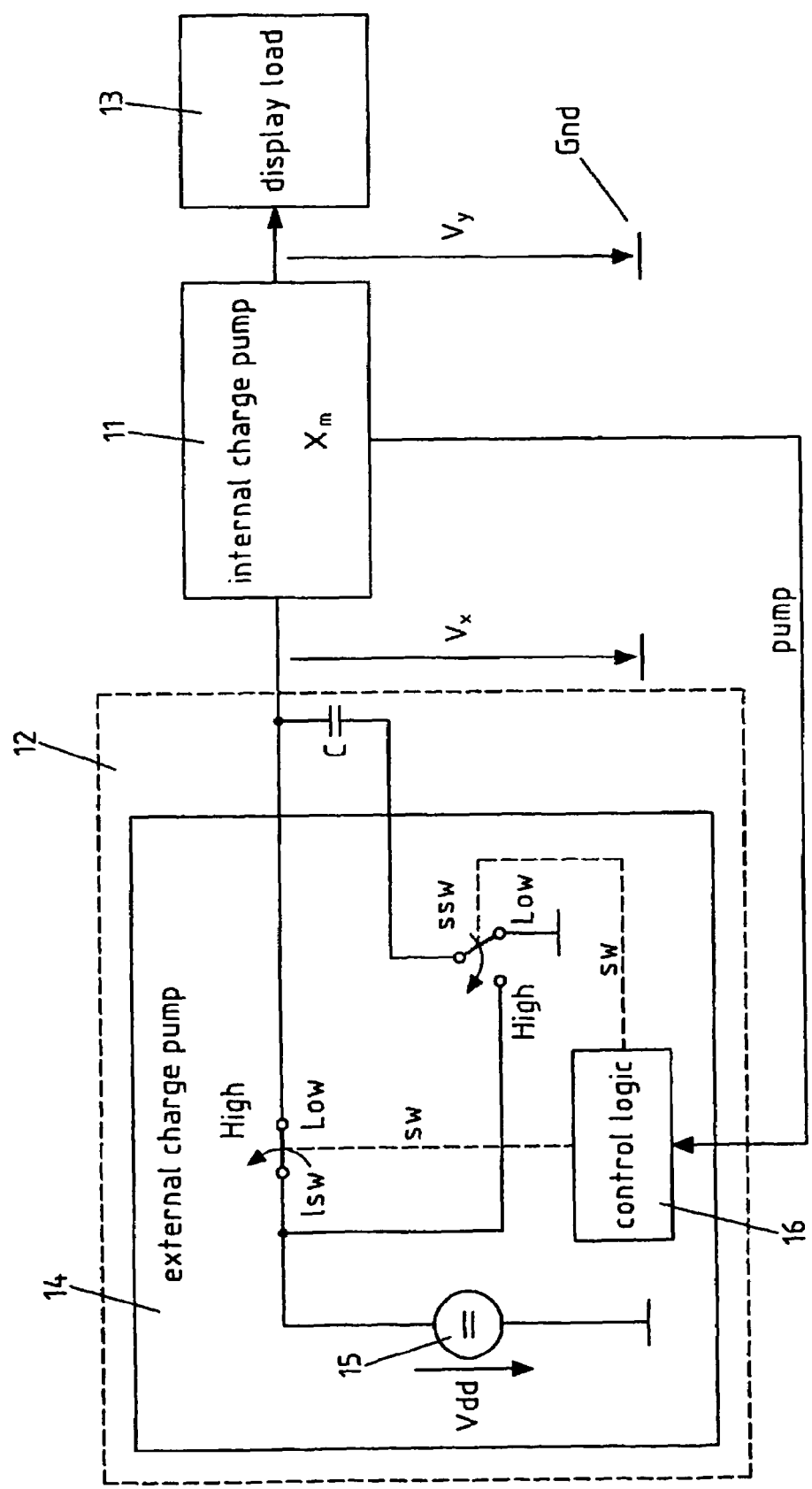

The course of each of the signals in FIGS. 2a–2d is shown over time and in this order for a precharge phase, a startup phase and a regulation phase, of which phases the precharge phase and the startup phase have a predetermined length.

During the entire precharge phase, the control logic 16 provides a low control signal sw to the loadswitch lsw and the shiftswitch ssw. Thus, the loadswitch lsw is closed and the shiftswitch ssw is connected to ground Gnd, and the external capacitor C is charged by the voltage source 15 of the external charge pump 14. At the end of the precharge phase, the potential at the top plate of capacitor C, and thus voltage $V_x$, is equal to the voltage Vdd provided by the voltage source 15. At the same time, the display load 13 is precharged to $V_y$=Vdd.

At the beginning of the startup phase, control signal sw is set high by the control logic 16. Therefore, the loadswitch lsw is opened and the shiftswitch ssw is connected to the voltage supply Vdd. Since the bottom plate of capacitor C is now connected to voltage source 15 and the capacitor C is fully charged, a voltage shifting takes place, shifting the top plate of the capacitor C in the ideal case to a potential of 2Vdd. Thus, the voltage supply for the internal charge pump 11 is now in the ideal case $V_x$=2Vdd.

The internal charge pump 11 multiplies the applied voltage $V_x$ by the implemented multiplication factor $X_m$, and the display load 13 is continuously pumped up. The size of the external capacitor C should be at least in the same order as the size of the capacitance of the display load 13, because a pump up from Vdd to $X_m \times 2$Vdd would otherwise quickly discharge capacitor C completely.

In the startup phase, the internal charge pump 11 further supplies pump signals to the control input of the control logic 16. The counter of the control logic 16 counts in the startup phase a predetermined number k of received pump signals, and then starts a recharging of capacitor C by providing briefly a low control signal sw to the loadswitch lsw and the shiftswitch ssw again. Such a change from a high control signal sw to a low control signal after k pump signals and back to a high control signal sw after a short, predetermined period of time is repeated n times. In FIG. 2a, this is indicated by referencing to respective k pump signals by k(1), k(2), . . . k(n). The number n thus determines the length of the startup phase. It is determined dependent on the load 13 connected to the integrated charge pump 11 such that the voltage $V_y$ provided at the output of the internal charge pump 11 to the load 13 increases during the startup phase continuously from Vdd to a maximum of about $X_m \times 2$Vdd. After having recharged the capacitor C n times, a stable residual charge is reached on the capacitor C, since the load 13 has now been pumped up completely.

The repeated discharching and recharging of capacitor C during the startup phase while pumping up the load 13 is not visible directly in FIG. 2c, since the switching takes place so frequently that the resulting drawing and feeding of charge from and to the capacitor C is quite small. The curved form of voltage $V_x$ between the respective recharging steps in FIG. 2c appears in measurement results due to the fact that the switches lsw, ssw are not ideal. As can be seen in FIG. 2c, the influence of the non-ideal switches lsw, ssw is reduced as the display load 13 is pumped up to the maximum voltage $V_y=X_m \times 2$Vdd.

After the startup phase, the regulation phase of the internal charge pump 11 begins, in which the reached maximum voltage value or adjusted voltage value of $V_y$ is kept basically constant. In the regulation phase, typically only a single pumping operation in regular intervals is needed to hold the display load 13 on the regulated output voltage value, if the load 13 has a sufficiently high impedance. That is, the voltage $V_y$ decreases slowly until the respective next pumping operation, which pumping operation results again in an increase of the voltage $V_y$. Thereby, a slightly rippled voltage $V_y$ is achieved, which varies around the maximum voltage of $V_y=X_m \times 2$Vdd. It is to be noted that the ripples of the voltage $V_y$, which are very small compared to the maximum voltage of $V_y=X_m \times 2$Vdd, are not drawn to scale in FIG. 2. The control logic 16 is driven as before by corresponding pump signals provided at the signal output of the internal charge pump 11. Now, however, the few pump signals are supplied to the trigger circuit of the control logic 16. The trigger circuit generates briefly a low control signal sw at every received pump signal before outputting a high control signal sw again. During each low control signal sw, the capacitor C is recharged. Thereby, a constant pulsed supply voltage $V_x$ between close to Vdd and an ideal maximum voltage of 2Vdd exists for the internal charge pump 11.

In order to achieve a good power efficiency, the currents through the loadswitch lsw and the shiftswitch ssw are in the same order, and all other parasitic currents of the voltage doubling circuit 12 are minimized.

It is to be noted that the presented embodiment constitutes only a selected embodiment of the invention which can be varied in many ways.

The invention claimed is:

1. A voltage processing unit comprising an integrated charge pump for multiplying a voltage applied to an input of said integrated charge pump by a predetermined factor; and an external voltage doubling circuit for amplifying an available voltage and for applying said amplified voltage to said input of said integrated charge pump;

said voltage doubling circuit comprising a capacitor, of which capacitor a first connection is connected to said input of said integrated charge pump;

first switching means for connecting a voltage source to said input of said integrated charge pump when said first switching means is switched on;

second switching means for connecting a second connection of said capacitor either to ground or to a voltage source; and control means for providing control signals which alternatingly switch on the one hand said first switching means on and second switching means to ground and on the other hand said switching means off and said second switching means to a voltage source;

wherein said control means comprises a counter for switching said first switching means on and said second switching means to ground each time after having received a predetermined number of signals from said integrated charge pump in a startup phase, and a trigger circuit for switching said first switching means on and second switching means to ground with each signal received from said integrated charge pump in a subsequent regulation phase.

2. A voltage processing unit according to claim 1, wherein said control means is controlled by signals provided by said integrated charge pump.

3. A voltage processing unit according to claim 1 wherein said first switching means and said second switching means are realized with PMOS transistors.

4. A voltage processing unit according to claim 1 wherein said integrated charge pump is an integrated Dickson charge pump.

5. A method for providing an amplified voltage, said method comprising amplifying an available voltage by means of a voltage doubling circuit and multiplying said amplified voltage by a predetermined factor by means of an integrated charge pump;

wherein amplifying an available voltage includes counting to a predetermined value and upon reaching that predetermined value switching a first switching means on and a second switching means to ground in a startup phase, and switching said first switching means on and said second switching means to ground with each signal received from said integrated charge pump in a subsequent regulation phase.

* * * * *